United States Patent
Takahashi et al.

(10) Patent No.: US 7,128,478 B2
(45) Date of Patent: Oct. 31, 2006

(54) OPTICAL FIBER REINFORCING METHOD AND OPTICAL FIBER REINFORCING DEVICE

(75) Inventors: Kenji Takahashi, Chiba (JP); Noriyuki Kawanishi, Chiba (JP); Manabu Fujisawa, Chiba (JP)

(73) Assignee: Fujikura Ltd., Tokyo (JP)

( * ) Notice: Subject to any disclaimer, the term of this patent is extended or adjusted under 35 U.S.C. 154(b) by 266 days.

(21) Appl. No.: 10/834,849

(22) Filed: Apr. 30, 2004

(65) Prior Publication Data
US 2004/0218878 A1    Nov. 4, 2004

(30) Foreign Application Priority Data
May 1, 2003    (JP)    ............................ P2003-126620

(51) Int. Cl.
*G02B 6/255*    (2006.01)
(52) U.S. Cl. ....................................................... 385/99
(58) Field of Classification Search ................... None
See application file for complete search history.

(56) References Cited

U.S. PATENT DOCUMENTS 4,509,820 A * 4/1985 Murata et al. ................ 385/99
4,678,272 A * 7/1987 Finn et al. ..................... 385/99
6,153,258 A * 11/2000 Goldman et al. ........ 427/163.2

FOREIGN PATENT DOCUMENTS

| JP | H06-095508 A | 4/1994 |
| JP | H07-311316 A | 11/1995 |
| JP | 2001-274128 A | 10/2001 |
| JP | 3334426 B2 | 8/2002 |
| JP | 3337874 B2 | 8/2002 |

* cited by examiner

*Primary Examiner*—Sung Pak
*Assistant Examiner*—Mike Stahl
(74) *Attorney, Agent, or Firm*—Sughrue Mion, PLLC

(57) ABSTRACT

In an optical fiber fusion reinforcing device, a distance from an end face 723 to a mid point C6 of a reinforcing device 7 is set equal to a distance from a fusion splicing point M to an end face of a fusion splicing device 6 where optical fibers 3, 3 are inserted. The fusion splicing device 7 includes: positioning member 72 for aligning a mid point C7 of a heat shrinkable reinforcing member 13, which is slidably mounted on the fusion spliced optical fibers, and the fusion splicing point M of the optical fibers 3, 3 with each other; housing portion for housing the optical fibers 3, 3 and the heat shrinkable reinforcing member 13 so that the fusion splicing point M and the mid point of the heat shrinkable reinforcing member 13 are aligned, and heater for melting the heat shrinkable reinforcing member 13 in the housing portion.

18 Claims, 9 Drawing Sheets

OPTICAL FIBER REINFORCING METHOD AND OPTICAL FIBER REINFORCING DEVICE

CROSS REFERENCE TO RELATED APPLICATIONS

This application is based upon and claims the benefit of priority from Japanese Patent Application No. P2003-126620, filed on May 1, 2003 in the Japanese Patent Office; the entire contents of which are incorporated herein by reference.

BACKGROUND OF THE INVENTION

1. Field of the Invention

The present invention relates to an optical fiber reinforcing method and an optical fiber reinforcing device reinforcing a fusion splicing point of optical fibers and particularly to an optical fiber reinforcing method and an optical fiber reinforcing device to improve the reinforcing operation of optical fibers.

2. Description of the Related Art

FIGS. 1A to 1C show a related art fusion splicing device, a related art reinforcing device, and a heat shrinkable reinforcing sleeve used in the related art reinforcing device.

With reference to FIG. 1A, the related art fusion splicing device 1 is a device for melting and splicing end faces of a pair of optical fibers 3, 3 by means of arc discharge generated by a pair of discharge electrode rods 14, 14 positioned at a mid point C1 of the fusion splicing device 1. Meanwhile, a part of a sheath portion is previously removed from each optical fiber 3, and the end faces of the optical fibers 3, 3 are cut with a special tool, such as a cleaver or the like to obtain a flat end face.

The related art fusion splicing device 1 is generally comprised of an optical fiber holder 11 to hold sheath portions of the pair of optical fibers 3, 3, a V-groove 12 to guide each optical fiber 3 from which the sheath portions have been removed are fixed, and the pair of discharge electrode rods 14, 14 for carrying out arc discharge.

Although the fusion splicing device 1 shown in FIG. 1A integrally has a heating and reinforcing device 2, the fusion splicing device 1 and the heating and reinforcing device 2 may be formed as separate bodies.

Generally, the strength of a fusion spliced optical fiber is weak at a fusion splicing point M thereof. Therefore, in general, the fusion spliced optical fiber 3 is reinforced with a reinforcing member, such as a heat shrinkable reinforcing sleeve, for protecting and reinforcing the fusion splicing point M.

With reference to FIG. 1C, a heat shrinkable reinforcing sleeve 13 is generally comprised of an outer-tube 131 which shrinks when heated, an inner-tube 132 which is melted by heat of a heater (not shown here), a strength member 134 made of metal or the like, and a fusible hot-melt 133 filling inside the outer-tube 131. The heat shrinkable reinforcing sleeve 13 is fused with the optical fibers 3, 3 by the heating and reinforcing device 2 (Japanese Patent No. 3337874 and Japanese Patent No. 3334426).

Prior to execution of the fusion splicing step with the optical fiber fusion splicing device 1, one of the optical fibers 3, 3 is inserted into the inner-tube 132 to attach the heat shrinkable reinforcing sleeve 13.

As shown in FIG. 1A, the heating and reinforcing device 2 is generally comprised of a housing 21 to house the fusion spliced optical fiber 3, a lid 22 mounted to the housing portion 21, and the heater (not shown). The lid 22 is attached to the housing portion 21 through a hinge mechanism or the like so as to be able to open and close. The fusion spliced optical fiber 3 is housed in a predetermined position in the housing 21 in a state where the lid 22 is open. When the lid 22 is closed, the inserted optical fiber 3 is held by the lid 22 to the predetermined position, and the heat shrinkable reinforcing sleeve 13 is heat shrunken by the heater (not shown) and the inner-tube 132 and the hot-melt 133 are fused at the fusion splicing point M of the optical fiber 3 and its vicinity (a heating step).

While heating the fusion spliced optical fiber 3 and the sleeve 13, because the strength member 134 is made of metal or the like and withstands an amount of heat generated by the heater, the strength member 134 is not melted and keeps its shape in the heat shrinkable reinforcing sleeve 13.

The strength member 134 is disposed in parallel with the fusion splicing point M of the fusion spliced optical fiber 3 and reinforces the fusion spliced optical fiber 3.

As a result of the above-heating step, the melted inner-tube 132 and hot-melt 133 fix the strength member 134 and the fusion splicing point M of the fusion spliced optical fiber 3, all of which are covered with the outer-tube 131.

In general, prior to carrying out the heating and reinforcing step, a mid point C3 of the heat shrinkable reinforcing sleeve 13 and the fusion splicing point M have to be aligned with each other. If the same tool (a sheath remover, cutter, or the like) is used to obtain a flat face at the pair of left and right optical fibers 3, 3, lead lengths of the left and right optical fibers 3, 3 from which the sheaths have been removed are the same as each other.

As shown in FIG. 1B, the total length (L1×2) of the lengths L1 of lead portions 31, 31 of the pair of left and right optical fibers 3, 3 are set to be shorter than a length L2 of the heat shrinkable reinforcing sleeve 13. Therefore, portions of the heat shrinkable reinforcing sleeve 13 are also fused over an overwrap portion 17, 17 of the sheaths of the left and right optical fibers 3, 3. If a length of the overwrap portion 17 is L3, length L3 can be obtained by (L2−L1×2)÷2. Therefore, L2=L3×2+L1×2 (FIG. 1B). If left and right optical fibers 3, 3 are subjected to heating and reinforcement, it is preferable that this relationship is satisfied.

Consequently, in order to satisfy this relationship, the fusion splicing point M of the optical fiber 3 and a mid point C3 of the heat shrinkable reinforcing sleeve 13, and a mid point C2 of the heating and reinforcing device 2 are aligned with one another while heating and reinforcing step.

If the heating and reinforcing step is carried out in a state where the points M, C2, and C3 not aligned with each other, the length L3 of the overwrap portion 17 will be short and therefore not all parts of the lead portions 31 (a bare fiber) may be heated and reinforced.

In this case, the strength of the fusion spliced optical fiber 3 is not sufficiently secured, a portion of the lead portions 31 is left exposed, the fusion splicing point M is not sufficiently protected, and the fusion spliced optical fiber 3 lacks reliability in communications.

Furthermore, heretofore, if air is left between the fusion spliced optical fiber 3 and the heat shrinkable reinforcing sleeve 13 while carrying out the heating and reinforcing step, the heat shrinkable reinforcing sleeve 13 and the fusion spliced optical fiber 3 or the overwrap portion 17 may peel off from each other, which causes strength and reliability problems and the like.

Therefore, in order to eliminate air remaining inside the heat shrinkable reinforcing sleeve 13, the heating and reinforcing step is gradually carried out from the mid point C2 toward end portions of the heating and reinforcing device 2 or a portion to be heated is sloped so that shrinkage occurs from the mid point C2 to opposite ends.

If the heating and reinforcing step is carried out in the case where the fusion splicing point M, the mid point C3 of the heat shrinkable reinforcing sleeve 13, and the mid point C2 of the heating and reinforcing device 2 are not aligned with each other, distances respectively from the mid point C2 of the heating and reinforcing device 2 where heating starts to the left and right opposite ends where the heating and reinforcing step ends are different from each other and time required to melt one heat shrinkable reinforcing sleeve and time required to melt the other sleeve 13 do not coincide with each other. As a result, bubbles may be trapped.

Therefore, it is important that the fusion splicing point M, the mid point C3 of the heat shrinkable reinforcing sleeve 13, and the mid point C2 of the heating and reinforcing device 2 are aligned with each other while carrying out the heating and reinforcing step. Hereafter, an operation for aligning the mid points as described above is referred to as a centering operation.

FIGS. 2A to 2C show a related art centering operation with the conventional heating and reinforcing device 2. One of optical fibers 3, 3 to be fusion spliced to each other is passed through the heat shrinkable reinforcing sleeve 13 in advance. After the fusion splicing step has finished, an operator O opens the optical fiber holder 11 and moves the fusion spliced optical fiber 3 to the heating and reinforcing device 2. As shown in FIG. 2A, at this time, the operator O lowers one side of the fusion spliced optical fiber 3 with respect to the other side (or lifts the one side with respect to the other side) and, as a result, the heat shrinkable reinforcing sleeve 13 slides along with the fusion spliced optical fiber 3 in a direction of an arrow in FIG. 2A due to its own weight. Here, the operator O manually lifts and lowers the fusion spliced optical fiber 3 to move the heat shrinkable reinforcing sleeve 13 to a state where the fusion splicing point M of the fusion spliced optical fiber 3 and the mid point C3 of the heat shrinkable reinforcing sleeve 13 are aligned with each other. Here, the operator O visually checks whether the mid point C3 and the fusion splicing point M are aligned with each other.

As shown in FIG. 2B, the operator O moves the fusion spliced optical fiber 3 together with the heat shrinkable reinforcing sleeve 13 to the mid point C2 of the heating and reinforcing device 2 while keeping the mid point C3 of the heat shrinkable reinforcing sleeve 13 and the fusion splicing point M are aligned with each other.

With reference to FIG. 2C, the operator O visually confirms that the fusion splicing point M, the mid point C3 of the heat shrinkable reinforcing sleeve 13, and the mid point C2 of the heating and reinforcing device 2 are aligned with each other. Then, the heat shrinkable reinforcing sleeve 13 and the fusion spliced optical fiber 3 are moved together into the housing 21 of the heating and reinforcing device 2. The lid 22 is closed and a heating and reinforcing step starts.

FIG. 3 shows another centering method with another related art heating and reinforcing device.

With reference to FIG. 3, to align the fusion splicing point M and the mid point C3 of the heat shrinkable reinforcing sleeve 13 to each other, the fusion spliced optical fiber 3 is slid in parallel with the heating and reinforcing device 2 and in a direction of an arrow in FIG. 3 while keeping the heat shrinkable reinforcing sleeve 13 in contact with a portion (designated by P in FIG. 3) of the heating and reinforcing device 2. After sliding the fusion spliced optical fiber 3 until the fusion splicing point M of the fusion spliced optical fiber 3 and the mid point C3 of the heating and reinforcing device 2 are aligned with each other, the operator O puts the optical fiber 3 together with the heat shrinkable reinforcing sleeve 13 in the mid point C2 of the heating and reinforcing device 2 similarly to the above description, and the heating and reinforcing step is executed.

FIG. 4 shows a related art recoater. The recoater 5 is one of the related art reinforcing devices. As a method of reinforcing the fusion splicing point M of the fusion spliced optical fiber 3, in addition to the above case of using the heating and reinforcing device 2 and the heat shrinkable reinforcing sleeve 13, there is a method in which special resin (UV curing resin) is injected into and around the fusion splicing point M of the recoater 5 and a light for curing the resin is irradiated to a portion where the resin has been injected to thereby coat the fusion splicing point M with the resin (Japanese Patent Application Laid-open No. 7-311316).

The recoater 5 is generally formed of a die mold 51 into which the fusion splicing point M is fixed and the resin is injected, a gate 52 formed on the die mold 51 and through which the UV curing resin is injected, a light irradiation portion (not shown), and holders 53, 53 for fixing the fusion spliced optical fiber 3.

The die mold 51 further comprises main bodies 51a, 51b detachable from each other.

The gate 52 may be provided to one of or each of the main bodies 51a, 51b in advance. End faces of the main bodies 51a, 51b to be joined to each other are provided with left and right inserting holes 54 into which the fusion spliced optical fiber 3 is inserted.

The gate 52 is provided to a center on the die mold 51 and the fusion splicing point M needs to be disposed precisely in a position of the gate 52 while executing a reinforcing step. In the centering operation using recoater 5, the operator O aligns the fusion splicing point M and the gate 52 with each other by a visual check similarly to the case using the heating and reinforcing device 2.

3. Problems With The Related Art

However, the centering operation is carried out by the visual check by the operator O in the above method with the fusion splicing device 1 and the heating and reinforcing device 2, especially the operation of aligning the mid point C3 of the heat shrinkable reinforcing sleeve 13 with the fusion splicing point M requires skill, and it is difficult to carry out precise centering. In this method, a deviation of about ±1 mm occurs in the conventional centering operation.

In lifting and lowering the opposite ends of the fusion spliced optical fiber 3 to allow the heat shrinkable reinforcing sleeve 13 to slide due to its own weight, the operator O has to change a position of the optical fiber 3 to hold over and over again. In this case, if the fusion spliced optical fiber 3 has only a short extra length to be connected and from a closure or a cable into which the fusion spliced optical fiber 3 is inserted, the operator O may forcibly pull out the fusion spliced optical fiber 3 so as to change the hold position and, as a result, may damage the sheath of the fusion spliced optical fiber 3 or break the fusion spliced optical fiber 3.

In this centering operation, because the heat shrinkable reinforcing sleeve 13 which has been housed in the heating and reinforcing device 2 is positioned in heating portion in the heating and reinforcing device 2, the fusion spliced optical fiber 3 extending out of the heating and reinforcing device 2 from the left and right surface of the device 2 is gradually pulled or pushed back to thereby position the fusion splicing point M of the fusion spliced optical fiber 3 to the mid point C3 of the heat shrinkable reinforcing sleeve 13 after the heat shrinkable reinforcing sleeve 13 has once being housed in the heating portion. In order to carry out the centering operation by this method, the fusion spliced optical fiber 3 needs to be reciprocated leftward and rightward many times and it is difficult to align the fusion splicing point M, the mid point C2 of the heating and reinforcing device 2, and the mid point C3 of the heat shrinkable reinforcing sleeve 13 with each other.

In the method in which the heat shrinkable reinforcing sleeve 13 is brought in contact with the end portion P of the conventional heating and reinforcing device 2, the end portion P of the conventional heating and reinforcing device 2 is not necessarily formed into a structure suitable for allowing the heat shrinkable reinforcing sleeve 13 to come in contact with the end portion P. Therefore, the centering operation is difficult, and besides, there is a fear of damaging the fusion spliced optical fiber 3 while sliding the fusion spliced optical fiber 3.

Additionally, according to the method with the recoater 5, a mid point C4 of the die mold 51 and the fusion splicing point M need to be aligned with each other and the operator O needs to constantly give consideration so as to position the fusion splicing point M at the mid point C4 of the die mold 51 while moving the fusion splicing point M and also after the fusion splicing point M is positioned to the die mold 51. The fusion spliced optical fiber 3 used in the recoater 5 has a sheath diameter of 250 to 900 μm in many cases and the visual centering has an extremely low efficiency and requires skill of the operator O.

Also, because a speed at which the UV curing resin is filled via the gate 52 into the die mold 51 is constant, the UV curing resin is not evenly filled, and besides, it takes longer to fill the resin if the mid point C4 and the fusion splicing point M are not aligned with each other.

Furthermore, in a state where the resin is not fully filled, pressure in the die mold 51 is uneven, and therefore it is difficult to obtain a uniform UV sheath diameter after UV cure.

The present invention has been made to solve the above-described problems of the related art methods, and it is an object of the invention to provide an optical fiber reinforcing method and an optical fiber reinforcing device in which a fusion splicing point of an optical fiber, a mid point of a heat shrinkable reinforcing sleeve, and a mid point of a heating and reinforcing device can easily be aligned with each other.

SUMMARY OF THE INVENTION

To achieve the above object, according to this invention, there is provided an optical fiber reinforcing method using an optical fiber fusion splicing device comprising first and second guide portions where first and second optical fibers are arranged for fusion splicing at a fusion splicing position, an optical fiber reinforcing device shaped so that a first distance from an end face to a mid point of the reinforcing device is set to be equal to a second distance from the fusion splicing position of the fusion splicing device to an end face of the first guide portion, and a contact member comprising a contact face positioned on the reinforcing device at a distance of half of a total length of a heat shrinkable reinforcing member from the mid point of the reinforcing device, the method comprising: arranging the reinforcing member on the first optical fiber; arranging the first optical fiber, with the reinforcing member, in the first guide portion so that it extends to the fusion splicing position of the fusion splicing device; arranging the second optical fiber in the second guide portion so that it extends to abut the first optical fiber at the fusion splicing position of the fusion splicing device; fusion splicing the first and second optical fibers at the fusion splicing position of the fusion splicing device to form a fusion spliced optical fiber with a fusion spliced point; holding the fusion spliced optical fiber at the end face of the first guid portion as a reference hold position; removing the fusion spliced optical fiber, with the reinforcing member, from the fusion splicing device while maintaining holding at the reference hold position; moving the fusion spliced optical fiber, with the reinforcing member, so that the reinforcing member is positioned between the contact member and the reference hold position, while maintaining holding at the reference hold position; sliding the fusion spliced optical fiber and the reinforcing member until an end face of the reinforcing member contacts the contact face of the contact member to align the mid point of the reinforcing device and the mid point of the reinforcing member with each other, while maintaining holding at the reference hold position; sliding the fusion spliced optical fiber toward the contact face of the contact member until the reference hold position comes in contact with the end face of the reinforcing device, thereby aligning a fusion spliced point of the fusion spliced optical fiber, the mid point of the reinforcing device, and the mid point of the reinforcing member; and heating the fusion spliced optical fiber together with the reinforcing member in a heating portion of the reinforcing device with the fusion spliced point, the mid point of the reinforcing member, and the mid point of the reinforcing device aligned with each other.

DETAILED DESCRIPTION OF THE INVENTION

Exemplary embodiments of the invention will now be described below by reference to FIGS. 5 to 9B. The described exemplary embodiments are intended to assist the understanding of the invention, and are not intended to limit the scope of the invention in any way.

Figure 1A:
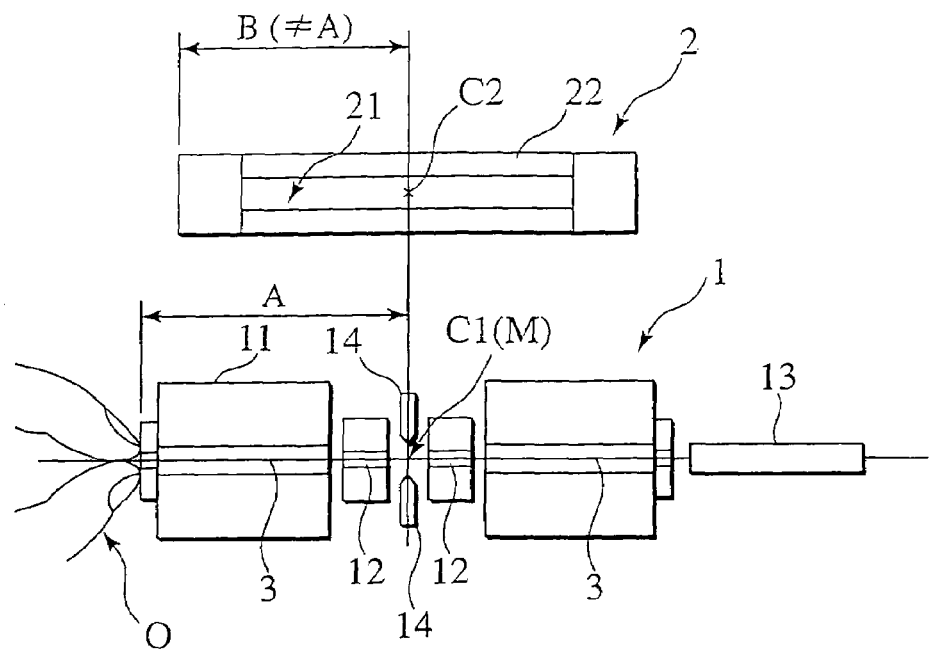
FIGS. 1A to 1C are schematic diagrams of a related art fusion splicing device and reinforcing device and a heat shrinkable reinforcing sleeve used for this reinforcing device.
Figure 1B:
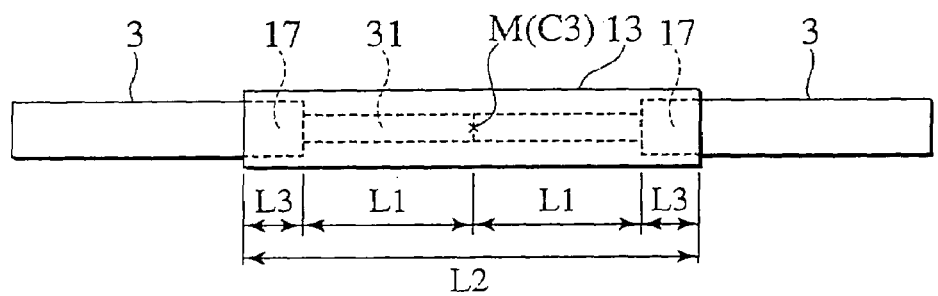
Figure 1C:
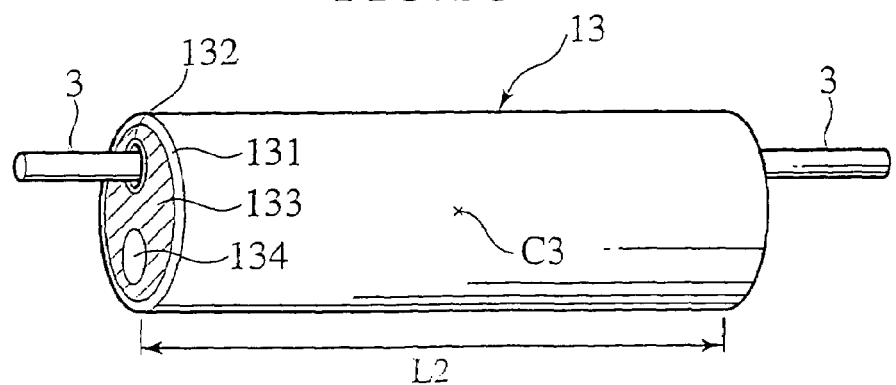
Figure 2A:
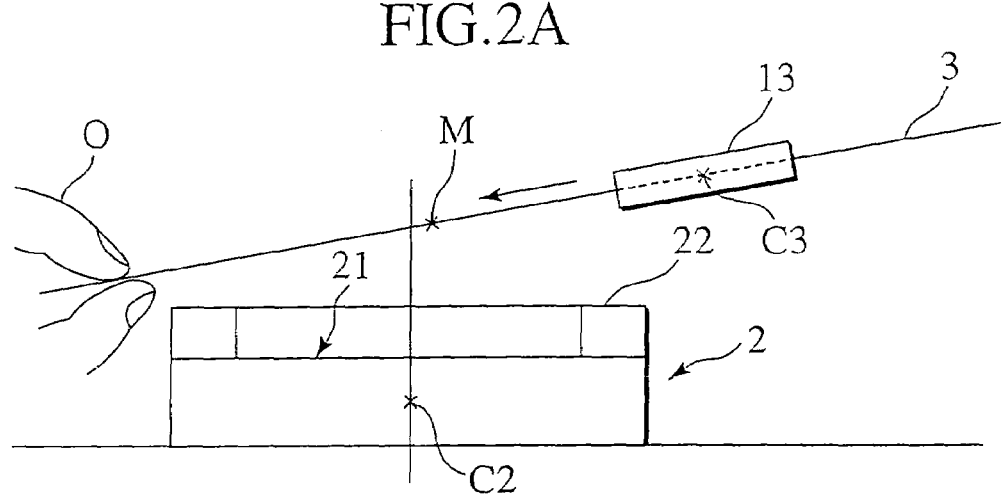
FIGS. 2A to 2C are explanatory diagrams showing a first related art step with a heating and reinforcing device.
Figure 2B:
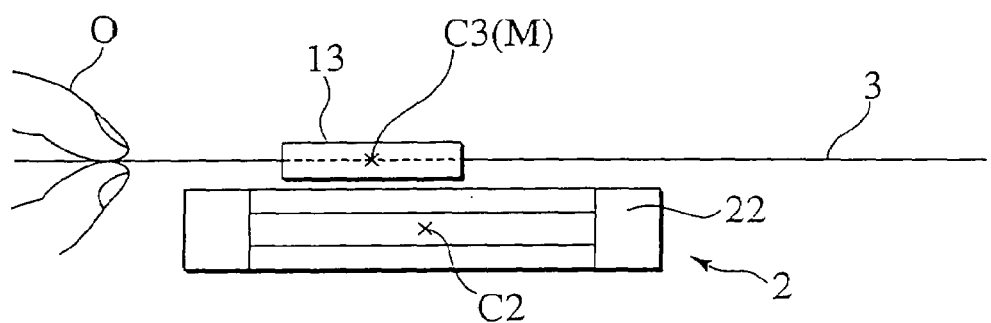
Figure 2C:
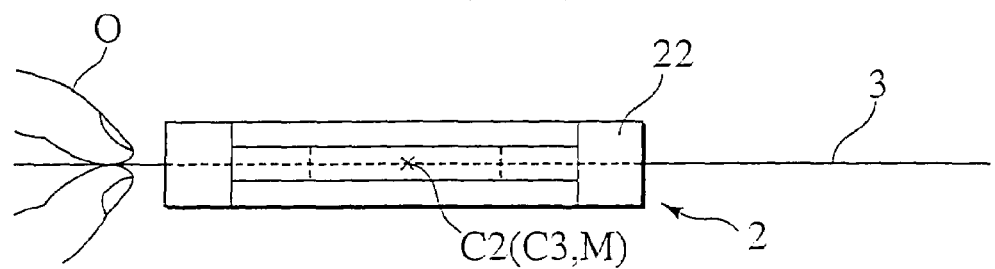
Figure 3:
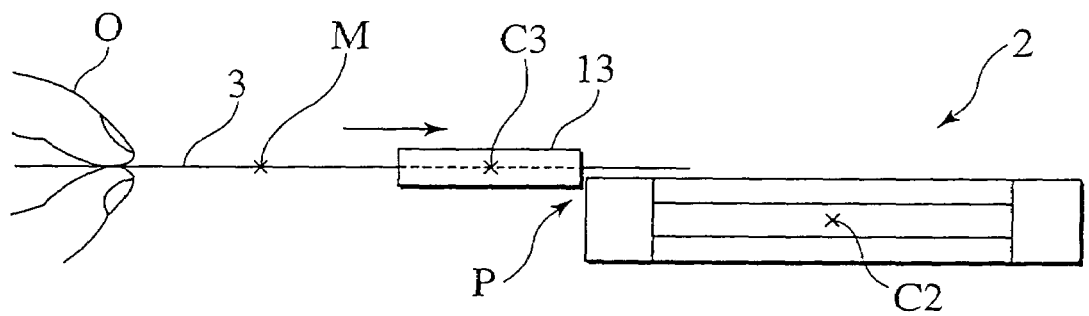
FIG. 3 is an explanatory view showing a second related art step with the heating and reinforcing device.
Figure 4:
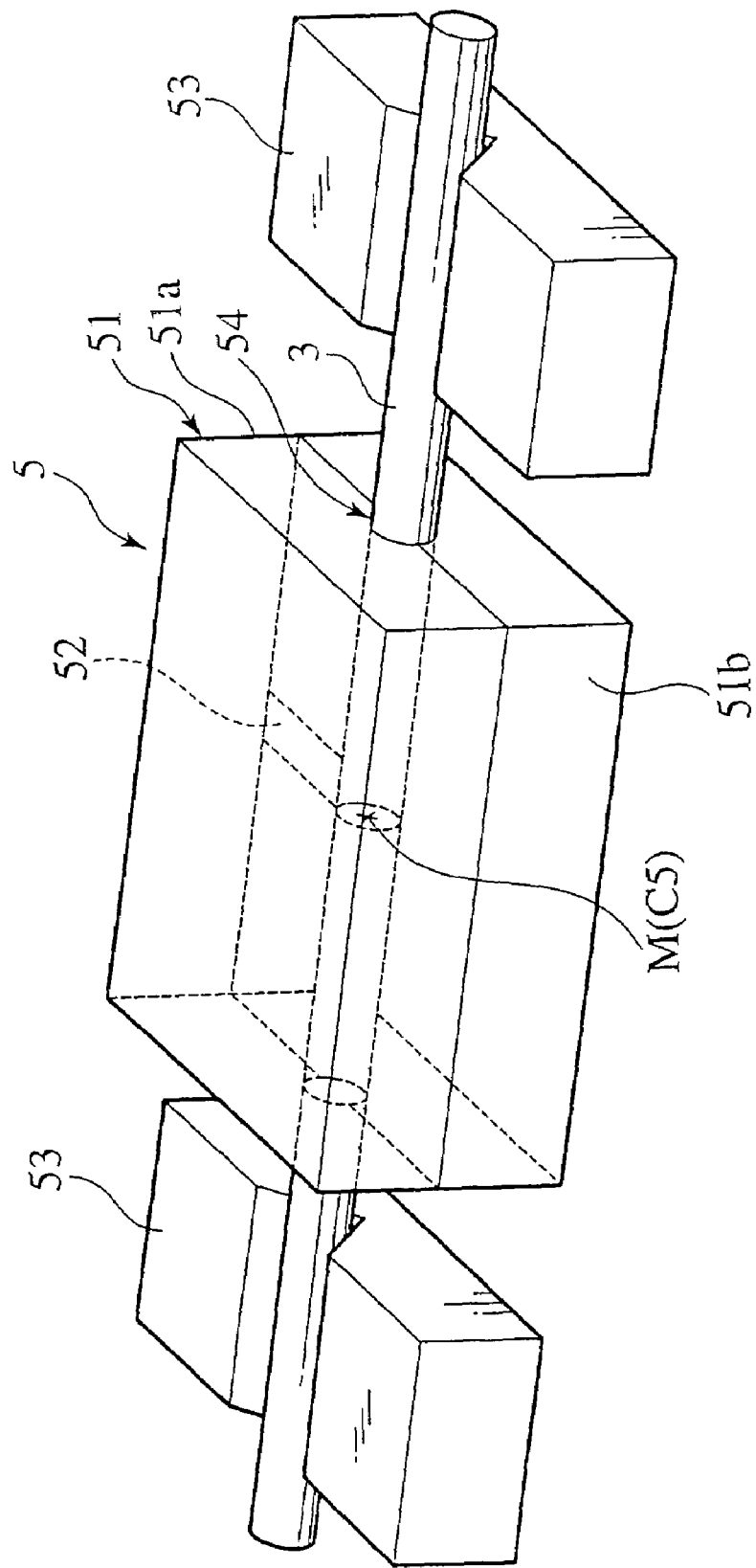
FIG. 4 is a conceptual diagram of a related art recoater.
Figure 5:
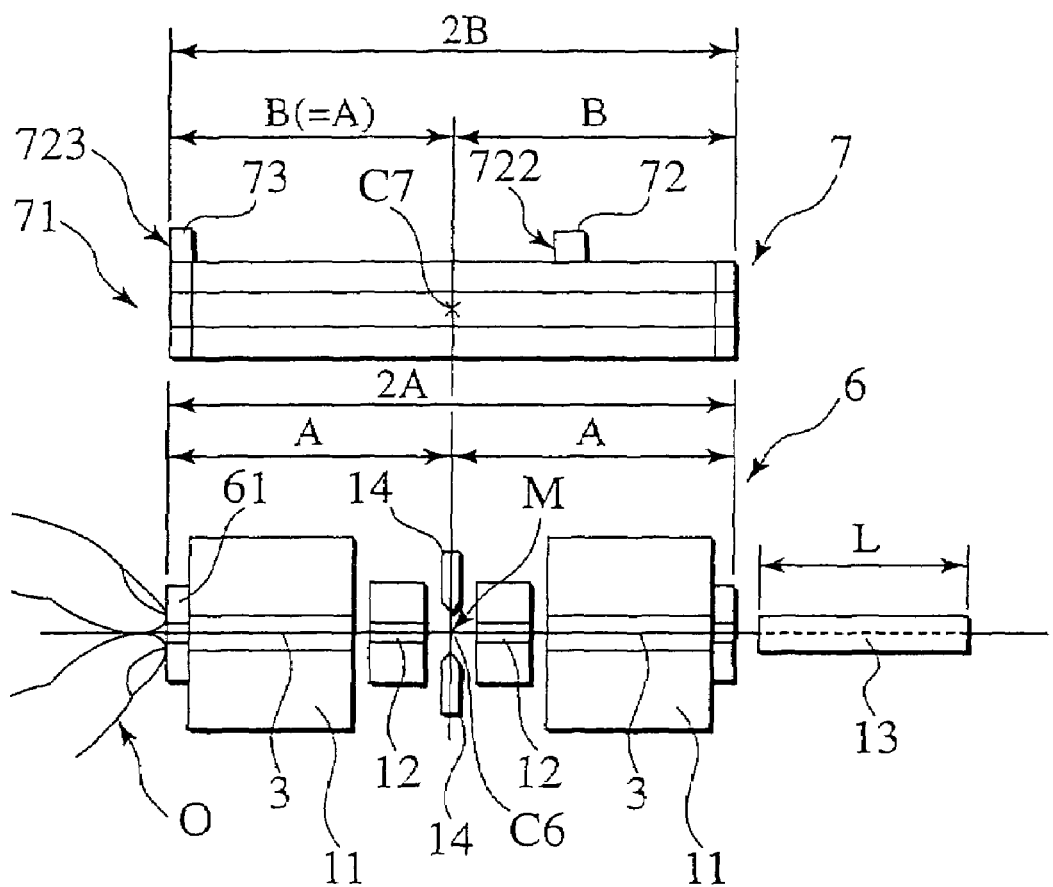
FIG. 5 is a conceptual diagram of a fusion splicing device and a heating and reinforcing device according to a first embodiment of the present invention.

With reference to FIG. 5, although a fusion splicing device 6 and a heating and reinforcing device 7 which will be described later are formed integrally, it is possible to form a fusion splicing device 6 and the a reinforcing device 7 as separate bodies.

As shown in FIG. 5, the fusion splicing device 6 of this embodiment is generally comprised of a pair of holders 11, 11 for holding sheath portions of the pair of optical fibers 3, 3, a pair of V-grooves 12, 12 in which the optical fibers 3, 3 from which the sheath portions have been previously removed with a special tool or the like are fixed, and a pair of discharge electrode rods 14, 14 for carrying out arc discharge.

The fusion splicing device 6 according to the invention is designed so that a total length (=2B) of the heating and reinforcing device 7 which will be described later becomes equal to a total length (=2A) of the fusion splicing device 6. The total lengths of the devices 6, 7 do not necessarily have to be equal to each other, however at least lengths from end faces from which the optical fibers to be fusion spliced are inserted, i.e., end faces provided with a guide 71 which will be described later to mid points M, C7 of the respective devices 6, 7 have to be equal to each other. That is, a relational equation B=A is satisfied in FIG. 5. In the following description, the relational equation B=A is a precondition for embodiments of the invention.

Although the heating and reinforcing device 7 according to the invention is similar to the related art heating and reinforcing device 2, it utilizes additional features such as guide 71 and positioning member 72.

The guide 71 is a portion used by the operator O so as to reliably hold the fusion spliced optical fiber 3 in a vicinity of the end face of the device 7 while housing the fusion spliced optical fiber 3 in the heating and reinforcing device 7. Therefore, the guide 71 may be formed in any shape that allows the operator O to bring his/her fingers holding the fusion spliced optical fiber 3 into contact with the heating and reinforcing device 7.

The fusion splicing device 6 also comprises a guide 61 for performing the same function as the guide 71 on the end face of the device 6.

The guide 61 is formed with an inserting hole into which the left and right optical fibers 3, 3 are to be inserted. From this inserting hole, the left and right optical fibers 3, 3 are lead to the fusion splicing point M through the V-groove 12.

To the same face of the heating and reinforcing device 7 being provided with the positioning member 72, a protrusion 73 being configured to have the same height as the positioning member 72 is provided. While sliding the optical fiber 3, the operator O brings his/her fingers into contact with the protrusion 73 and slides the optical fiber 3 along with a recessed portion (not shown) provided onto the protrusion 73 to thereby carry out the operation, such as the centering operation, more efficiently.

In addition, according to the device 7 having such configuration as shown in FIG. 5, because an actual diameter of the heat shrinkable reinforcing sleeve 13 is about 1 to 6 mm and the fingers of the operator O come in contact with an end face 723, there is no problem to the operation even if the protrusion 73 is not provided.

Figure 6A:
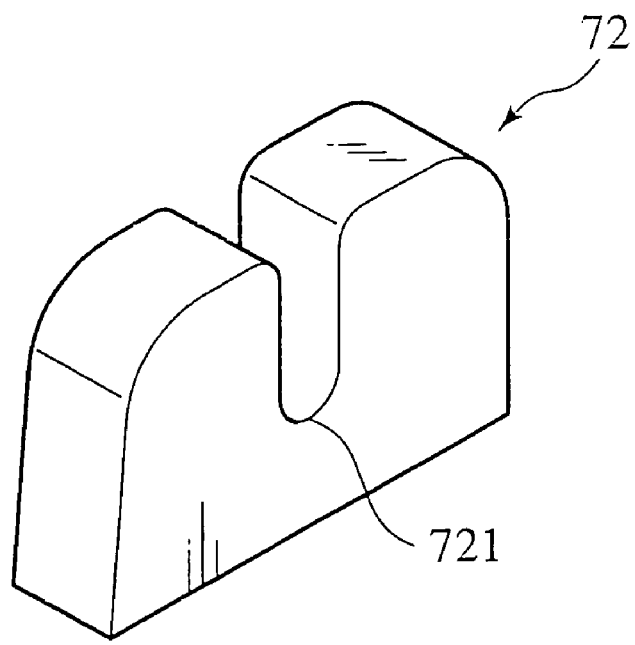
FIGS. 6A and 6B are schematic diagrams of a positioning member according to the present invention.
Figure 6B:
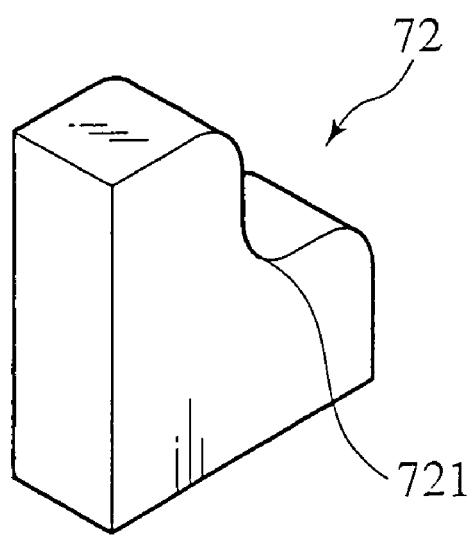

Meanwhile, the shape of the positioning member 72 can be formed in a projecting shape, or the positioning member 72 may be provided with a recessed portion 721 for guiding the sheath of the fusion spliced optical fiber 3 as shown in FIGS. 6A and 6B. Similarly to this recessed portion 721, portions to be in contact with the fusion spliced optical fiber 3 or the sheath of the optical fiber are properly chamfered so as not to damage the fusion spliced optical fiber 3 and the sheath of the optical fiber 3. Because the recessed portion 721 is provided, the fusion spliced optical fiber 3 can easily be slid along the recessed portion 721. With the recessed portion 721, a sliding direction of the fusion spliced optical fiber 3 is restricted and it is possible to further smoothly bring the heat shrinkable reinforcing sleeve 13 into contact with the positioning member 72.

Figure 8A:
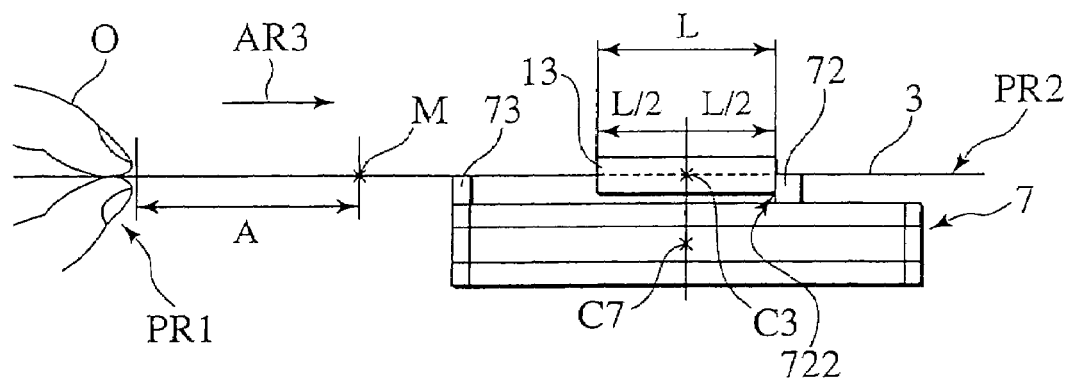
FIGS. 8A to 8C are explanatory diagrams for explaining a centering operation according to the present invention.

An end face 722 of the positioning member 72 on a side on which the fusion spliced optical fiber 3 is to be inserted is positioned at a distance of a half length of the heat shrinkable reinforcing sleeve 13 from the mid point C7 toward an end face opposite to the side on which the optical fiber is to be inserted (see FIG. 8A).

By changing a position of the positioning member 72, it is adaptable to any type of the heat shrinkable reinforcing sleeve with length of 10 mm to 60 mm.

Figure 7:
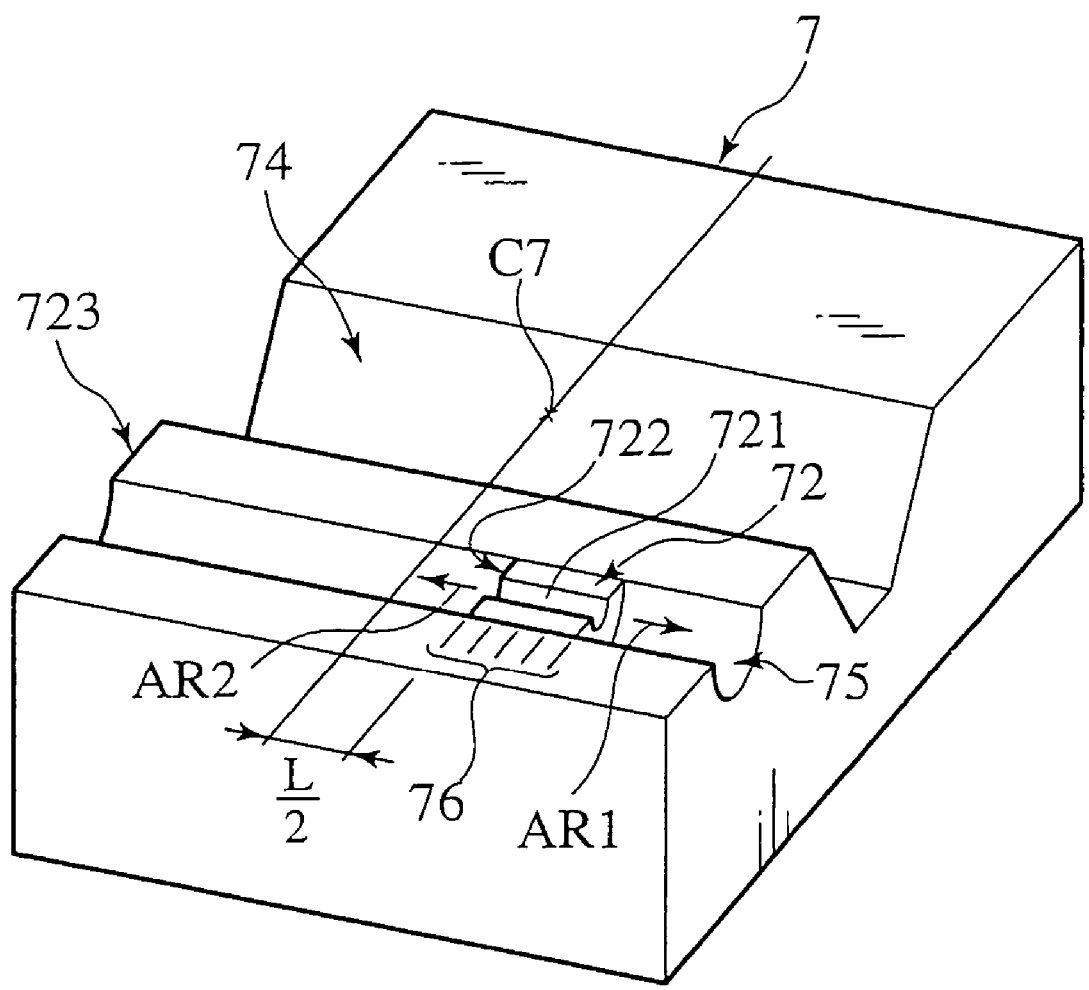
FIG. 7 is a conceptual diagram of a heating and reinforcing device having the positioning member which can be slid according to the present invention.

With reference to FIG. 7, the positioning member 72 is attached to a groove portion 75 provided in parallel to a heating portion 74 formed of a heater and the like (not shown) in a space in the heating and reinforcing device 7.

The positioning member 72 is freely slideable along the groove portion 75 in directions of arrows AR1 and AR2. A scale 76 is previously provided to the groove portion 75 and the end face 722 of the positioning member 72 is positioned to a position on the scale 76 corresponding to the total length of the heat shrinkable reinforcing sleeve 13 to be used. Thus, the end face 722 of the positioning member 72 is positioned at the distance of the half length of the heat shrinkable reinforcing sleeve 13 from the mid point C7, i.e., at the distance of L/2 from the mid point C7.

While inserting the fusion spliced optical fiber 3, the operator O can slide the fusion spliced optical fiber 3 to a desired position along the recessed portion 721 without damaging the fusion spliced optical fiber 3.

With reference to FIG. 7, in this embodiment, a portion corresponding to the guide 71 is not provided. In a structure as shown in FIG. 7, the end face 723 works as the guide 71, that is, the fingers of the operator O are brought into contact with the end face 723, and therefore there is no need to provide the guide 71 separately.

Although the positioning member 72 slides in the groove portion 75 provided in a place separate from the heating portion 74 in the embodiment in FIG. 7, the positioning member 72 may be provided to the heating portion 74. The heating portion 74 is formed in a recessed shape to house a heater for heating the heat shrinkable reinforcing sleeve 13, the heat shrinkable reinforcing sleeve 13, and the fusion spliced optical fiber 3 (not shown in FIG. 7). A shape of the positioning member 72 can be determined corresponding the recessed shape of the heating portion 74.

As a result, even if there is not enough space for providing the groove portion 75, the centering operation similar to the above-described one can be carried out in the heating portion 74. Furthermore, because the positioning member 72 is provided inside the heating portion 74, all operations for the centering operation can be carried out inside the heating portion 74.

Figure 8B:
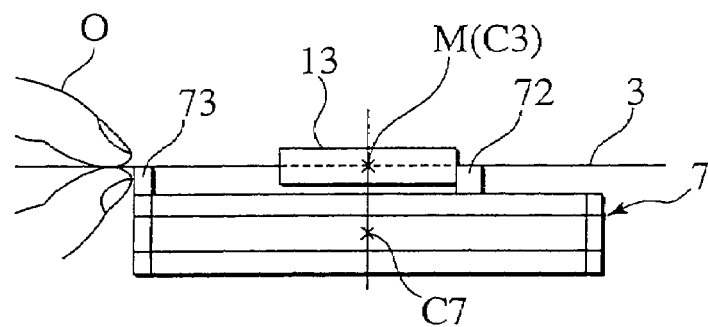
Figure 8C:
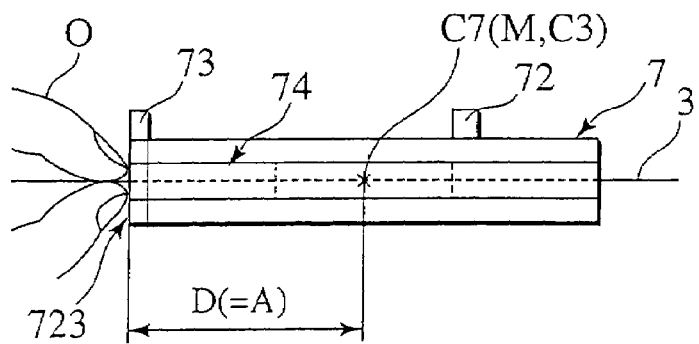

With reference to FIGS. 8A to 8C, the centering operation with the fusion splicing device 6 and the heating and reinforcing device 7 shown in FIG. 5 will be described below.

When the fusion splicing step has finished, the operator O moves the fusion spliced optical fiber 3 to the heating and reinforcing device 7 so as to execute a heating and reinforcing step.

During this step, the operator O moves the fusion spliced optical fiber 3 to the heating and reinforcing device 7 without moving a position of his/her fingers from a position where the optical fiber 3 has been held in carrying out the fusion splicing step.

This hold position is referred to as a reference hold position PR1.

During the above step, a length from the reference hold position PR1 to the fusion splicing point M is maintained equal to the length A from the end face to the mid point C6 of the fusion splicing device 6. Here, while moving the fusion spliced optical fiber 3, it is preferable that the other hold position (hereafter referred to as a reinforcing sleeve side hold position PR2) is a position at a distance of about 100 mm from the heat shrinkable reinforcing sleeve 13. While moving the fusion spliced optical fiber 3, the operator O holds the reference hold position PR1, hence the heat shrinkable reinforcing sleeve 13 is positioned between the positioning member 72 and the protrusion 73.

With reference to FIG. 8A, the operator O gradually slides the fusion spliced optical fiber 3 on a side of the reinforcing sleeve side hold position PR2 along the recessed portion 721 provided to the positioning member 72 in a direction of an arrow AR3.

Because the heat shrinkable reinforcing sleeve 13 is positioned between the positioning member 72 and the protrusion 73, a forward end face in the sliding direction of the heat shrinkable reinforcing sleeve 13 necessarily comes in contact with one end face of the positioning member 72 when the heat shrinkable reinforcing sleeve 13 and the fusion spliced optical fiber 3 are slid in the direction of the arrow AR3 in the drawing (step 1).

In this position, the mid point C3 of the heat shrinkable reinforcing sleeve 13 and the mid point C7 of the heating and reinforcing device 2 are relatively aligned with each other, because the relational expression B=A is satisfied in the invention as described above and because the positioning member 72 is provided at a distance of a half of a total length of the heat shrinkable reinforcing sleeve 13 from the mid point C7 of the heating and reinforcing device 7.

If the protrusion 73 is provided to the heating and reinforcing device 7 as shown in FIG. 8A, the operation can be carried out further smoothly by sliding the optical fiber 3 not only along the recessed portion 721 of the positioning member 72 but also along a recessed portion (not shown) provided onto the protrusion 73.

During this step, the operator O must not change the reference hold position PRE. In other words, the operation is carried out while maintaining the distance A between the reference held position PR1 and the fusion splicing point M.

With reference to FIG. 8C, while the heat shrinkable reinforcing sleeve 13 is kept in contact with the positioning member 72, i.e., while the mid points C7 and C3 are kept aligned with each other, the fusion splicing point M of the fusion spliced optical fibers 3 is slid toward the mid point C3 of the heat shrinkable reinforcing sleeve 13 until the fingers of the operator O on a side of the reference hold position PR1 comes in contact with the end face (a contact portion) 723 of the heating and reinforcing device 7. In this position, if the total length of the heat shrinkable reinforcing sleeve 13 is L, an end face of the heat shrinkable reinforcing sleeve 13 is disposed at a distance of L/2 from the mid point C7 of the heating and reinforcing device 7 and the reference hold position PR1 is in contact with the contact portion of the heating and reinforcing device 7, and therefore the fusion splicing point M and the mid point C3 of the heat shrinkable reinforcing sleeve 13 are aligned with each other (step 2).

Because the distance from the reference held position PR1 to the mid point C7 of the heating and reinforcing device 7 and the distance from a side face on the side of the reference hold position PR1 to the mid point C6 of the fusion splicing device 6 (FIG. 5) are equal to each other, the fusion splicing point M and the mid point C3 of the heat shrinkable reinforcing sleeve 13 are aligned with the mid point C7 of the heating and reinforcing device 7 through the preceding steps.

The operator O houses the fusion spliced optical fiber 3 and the heat shrinkable reinforcing sleeve 13 in the heating portion 74 while keeping the reference hold position PR1 so as to maintain positional relationships obtained through the above steps.

At this time, if the fusion spliced optical fiber 3 is inserted until the reference hold position PR1 comes in contact with the contact portion 723, the mid point C3 of the heat shrinkable reinforcing sleeve 13, the fusion splicing point M, and the mid point C7 of the heating and reinforcing device 7 are automatically aligned with each other (step 3). Then, the heating and reinforcing step starts.

As described above, in this embodiment, the distance from the end face to the mid point C7 of the optical fiber reinforcing device 7 is set to be the same distance as the distance from the end face to the mid point C6 of the fusion splicing device 6 and the positioning member which can slide to be adaptable to various heat shrinkable reinforcing sleeves is provided onto the optical fiber reinforcing device 7 to thereby form positioning means in the invention.

As a result, according to the embodiment, by moving the fusion spliced optical fiber 3 and the heat shrinkable reinforcing sleeve 13 by the operator O while keeping the reference hold position PR1, the centering operation can be carried out easily.

Also in the embodiment shown in FIG. 7, if the positioning member 72 is set in advance according to the scale to adapt to the heat shrinkable reinforcing sleeve 13 to be used, it is possible to adapt to the various heat shrinkable reinforcing sleeves 13.

The centering operation with the positioning member 72 can be carried out in the heating portion 74, there is no need to move the fusion spliced optical fiber 3 during the centering and the operation is further facilitated. That is, the step 3 can be omitted.

Figure 9A:
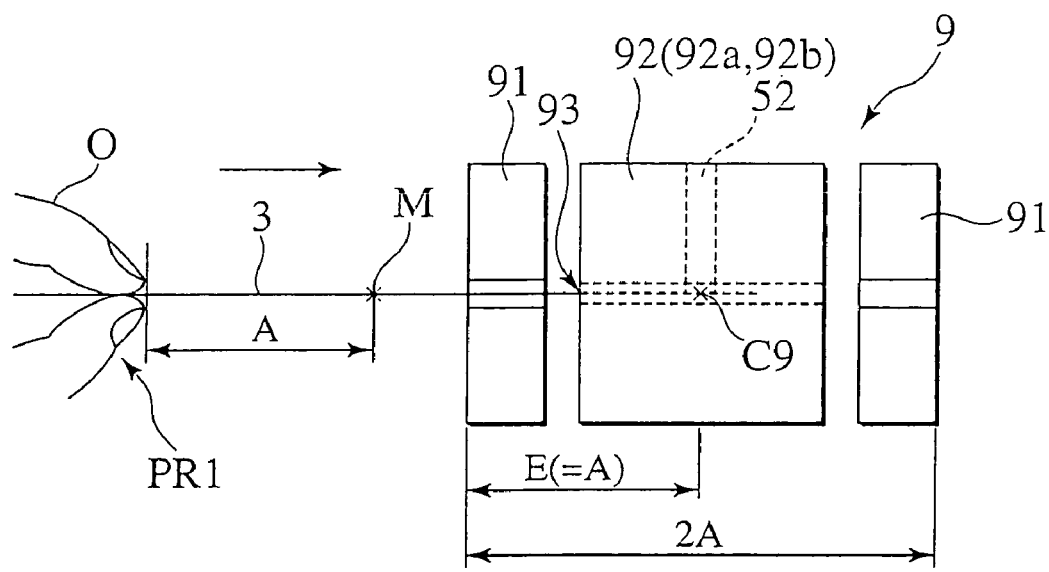
FIGS. 9A and 9B are conceptual diagrams according to a second embodiment of the present invention.

FIG. 9 shows a case in which a recoater 9 is used as an optical fiber reinforcing device. As shown in FIG. 9A, the recoater 9 is generally comprised of a die mold 92, holders 91, 91 by which the sheath portion of the fusion spliced optical fiber 3 is held, a gate 52 through which resin is injected, and an optical fiber insertion portion 93 connected to the gate 52 in the die mold 92. The die mold 92 further comprises main bodies 92a and 92b detachable from each other. The gate 52 through which resin is injected and the fusion spliced optical fiber 3 insertion portion are provided to at least one of the main bodies.

In the recoater 9 according to the present embodiment, a distance E from a mid point C9 to an end face on a side on which the fusion spliced optical fiber 3 is to be inserted of the recoater 9 is made equal to a distance A of the fusion splicing device 1 similarly to the above heating and reinforcing device 7.

Figure 9B:
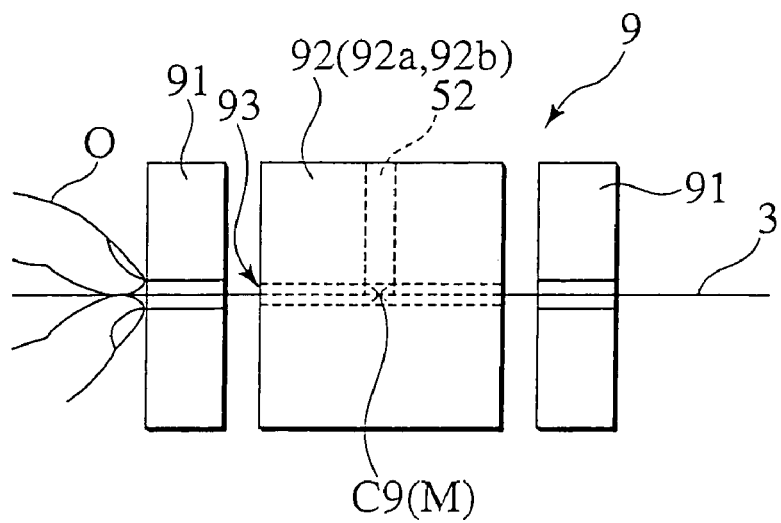

As shown in FIG. 9A, the operator O inserts the fusion spliced optical fiber 3 from the optical fiber inserting portion 93 into the die mold 92 along the optical fiber holder 91 while holding the reference hold position PR1. Next, as shown in FIG. 9B, the operator O inserts the fusion spliced optical fiber 3 until his/her fingers come in contact with the end face of the recoater 9 on the insertion side. In the embodiment, because the distance E from the mid point C9 to the end face on the side on which the fusion spliced optical fiber 3 is to be inserted of the recoater 9 is made equal to the distance A which is a half of the total length of the fusion splicing device 6, the fusion splicing point M and the mid point C9 of the recoater 9 have been aligned with each other and the centering operation has been completed through the preceding steps.

However, in the recoater 9, the mid point C9 of the recoater 9 and a position of the gate 52 are not necessarily aligned with each other. In this case, the centering operation may be carried out separately by using a mid point of the die mold 92 as a mid point for the centering operation.

According to the embodiment, it is possible to easily carry out the centering operation even with the reinforcing device such as a recoater, which the fusion spliced portion is coated and reinforced by injected resin.

Meanwhile, to ensure a stable arc during the operation, a wind protector (not shown) may be provided with the device for covering the area where the optical fiber fusion splicing device and the optical fiber reinforcing device are arranged. In this case, the reference hold position PR1 is determined when the fingers of the Operator O abut on a side surface of the wind protector.

Although the invention has been described above by reference to certain exemplary embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. An optical fiber reinforcing device comprising:
   a heating and reinforcing device shaped so that a first distance from an end face to a mid point thereof is set to be equal to a second distance from a fusion splicing position of an optical fiber fusion splicing device, which includes an optical fiber holding member and first and second guide portions for holding first and second optical fibers to be formed into a fusion spliced optical fiber with a fusion spliced point, to an end face of the holding member;
   a positioning means provided on the heating and reinforcing device for aligning a mid point of a heat shrinkable reinforcing member, which is inserted to the fusion spliced optical fiber and covers a fusion spliced point of the fusion spliced optical fiber, to a midpoint of the heating and reinforcing device;
   a housing provided on the main body and shaped to house the fusion spliced optical fiber and the reinforcing member and align the fusion splicing point and the mid point of the heat shrinkable reinforcing member with each other; and
   a heater provided in the housing to melt the reinforcing member.

2. An optical fiber reinforcing device according to claim 1, wherein the positioning means is arranged on the reinforcing device and comprises a contact portion, wherein a contact face of the contact portion is positioned at a distance of half of a total length of the reinforcing member from the mid point of the optical fiber reinforcing device, and an end face of the reinforcing member contacts the contact face to carry out positioning.

3. An optical fiber reinforcing device according to claim 1, wherein the positioning means comprises a groove which is provided on the heater, a contact portion comprising a contact face and which is slideable along the groove, and a scale which is provided along the groove and includes marks provided at distances of half of a total length of various reinforcing members from the mid point of the reinforcing device.

4. An optical fiber reinforcing device according to claim 1, wherein the optical fiber fusion splicing device is provided integrally with the optical fiber heating and reinforcing device.

5. An optical fiber reinforcing device wherein a first distance from an end face thereof to an injecting portion, through which fusion point reinforcing resin is injected, is equal to a second distance from a fusion splicing position of an optical fiber fusion splicing device, which includes an optical fiber holding member and first and second guide portions for holding first and second optical fibers to be formed into a fusion spliced optical fiber with a fusion spliced point, to the end face of the holding member, the optical fiber reinforcing device comprising:
   a pair of main bodies detachable from each other and comprising an inserting hole into which the fusion spliced optical fiber is inserted;
   a reinforcing resin injecting portion provided in at least one of the main bodies; and
   an irradiation portion for curing the reinforcing resin.

6. An optical fiber reinforcing device according to claim 1, further comprising a second positioning means for indicating that the fusion spliced point of the fusion spliced optical fiber is aligned with the mid point of the heating and reinforcing device.

7. An optical fiber reinforcing device according to claim 6, wherein the second positioning means protrudes from the heating and reinforcing device in the same plane as the end face thereof.

8. An optical fiber reinforcing device wherein a first distance from an end face thereof to a mid point of the reinforcing device is set to be equal to a second distance from a fusion splicing position of an optical fiber fusion splicing device, which has an optical fiber holding member and first and second guide portions which for holding first and second optical fibers to be formed into a fusion spliced optical fiber with a fusion spliced point, to an end face of the holding member, the optical fiber reinforcing device comprising:
   a housing for housing the fusion spliced optical fiber and a heat shrinkable reinforcing member which has been mounted to the fusion spliced optical fiber in advance of fusion of the first and second optical fibers;
   a heater provided in a vicinity of the housing to melt the reinforcing member; and
   a positioning member for aligning the mid point of the reinforcing device and a mid point of the reinforcing member with each other, wherein
   a contact face of the positioning member is disposed at a distance of a half of a total length of the reinforcing member from the mid point of the reinforcing device.

9. An optical fiber reinforcing device comprising:
   an optical fiber fusion splicing device comprising: an optical fiber holding member for holding and aligning first and second component optical fibers; and optical fiber fusion means for fusing the first and second component optical fibers into a fusion spliced optical fiber at a fusion spliced point, wherein the fusing takes place at a fusion splicing position of the optical fiber fusion splicing device,
   the optical fiber reinforcing device further comprising a heating and reinforcing device, comprising:
   positioning means for aligning a mid point of a heat shrinkable reinforcing member to the fusion spliced point of the fusion spliced optical fiber, wherein the heat shrinkable reinforcing member is slideably arranged on the fusion spliced optical fiber;

a housing shaped to house the fusion spliced optical fiber and the reinforcing member and maintain the alignment of the fusion splicing point and the mid point of the heat shrinkable reinforcing member; and a heater arranged to melt the reinforcing member, wherein a first distance measured from an end face to the mid point of the heating and reinforcing device is equal to a second distance measured from the fusion splicing position of the optical fiber fusion splitting device to an end face of the holding member thereof.

10. An optical fiber reinforcing device according to claim 9, wherein the positioning means protrudes from the heating and reinforcing device, and comprises a contact face positioned at a third distance from the mid point of the heating and reinforcing device;

the third distance is one-half of the total length of the reinforcing member; and and end face of the reinforcing member abuts the contact face to effect the alignment of the mid point of the reinforcing member and the fusion spliced point of the fusion spliced optical fiber.

11. An optical fiber reinforcing device according to claim 9, wherein the housing and heater are integrally formed;

the positioning means comprises a groove in the heater, a contact portion having a contact face, and a scale which is provided along the groove;

the scale comprises marks provided at a distance of half of a total length of variously sized reinforcing members from the mid point of the heating and reinforcing device; and the contact portion is slidable along the groove.

12. An optical fiber reinforcing device according to claim 9, wherein the optical fiber fusion splicing device is provided integrally with the heating and reinforcing device.

13. An optical fiber reinforcing device according to claim 9, wherein the optical fiber fusion means comprises opposing discharge electrode rods.

14. An optical fiber reinforcing device according to claim 9, further comprising a second positioning means for indicating that the fusion spliced point of the fusion spliced optical fiber is aligned with the mid point of the heating and reinforcing device.

15. An optical fiber reinforcing device according to claim 14, wherein the second positioning means protrudes from the heating and reinforcing device in the same plane as the end face thereof.

16. An optical fiber reinforcing device according to claim 9, wherein the positioning means is U-shaped.

17. An optical fiber reinforcing device according to claim 9, wherein the positioning means is L-shaped.

18. An optical fiber reinforcing device, comprising:

an optical fiber fusion splicing device comprising: an optical fiber holding member for holding and aligning first and second component optical fibers; and optical fiber fusion means for fusing the first and second component optical fibers into a fusion spliced optical fiber at a fusion spliced point, wherein the fusing takes place at a fusion splicing position of the optical fiber fusion splicing device, the optical fiber reinforcing device further comprising a reinforcing device, comprising:

first and second main bodies, which are detachable from each other, arranged adjacent to each other to comprise an inserting hole into which fused optical fibers are inserted;

a reinforcing resin injecting portion provided to at least one of the main bodies;

a holder arranged adjacent to the first and second main bodies; and an irradiation portion for curing the reinforcing resin, wherein a first distance measured from an end face of the holder to the injecting portion is set to be equal to a second distance measured from the fusion splicing position of the optical fiber fusion splitting device to an end face of the holding member thereof.

* * * * *